United States Patent [19]

Narisue et al.

[11] Patent Number: 4,726,794
[45] Date of Patent: Feb. 23, 1988

[54] SOCKET FOR AN ELECTRIC CHARGER OF A BATTERY

[75] Inventors: Masaharu Narisue; Shumi Akazawa, both of Hiroshima, Japan

[73] Assignee: Ryobi Ltd., Hiroshima, Japan

[21] Appl. No.: 8,202

[22] Filed: Jan. 29, 1987

[30] Foreign Application Priority Data

Jan. 31, 1986 [JP] Japan .............................. 61-13919[U]

[51] Int. Cl.⁴ ............................................ H01R 13/04
[52] U.S. Cl. .................................................... 439/752
[58] Field of Search ................ 439/701, 702, 731, 752

[56] References Cited

U.S. PATENT DOCUMENTS 3,536,869 10/1970 Renshaw, Jr. ...................... 439/701

Primary Examiner—Joseph H. McGlynn
Attorney, Agent, or Firm—Sughrue, Mion, Zinn, Macpeak & Seas

[57] ABSTRACT

A socket for a battery to be charged and connected to a charger circuit. Two terminal plates, connected to the charger circuit, are inserted into two side recesses and a bottom recess of a pusher members. Two socket body members pinch the pusher member and the terminal plates in lateral notches of the socket body members. The battery is inserted into a top hole of the assembled socket and electrically contacts the terminal plates.

7 Claims, 5 Drawing Figures

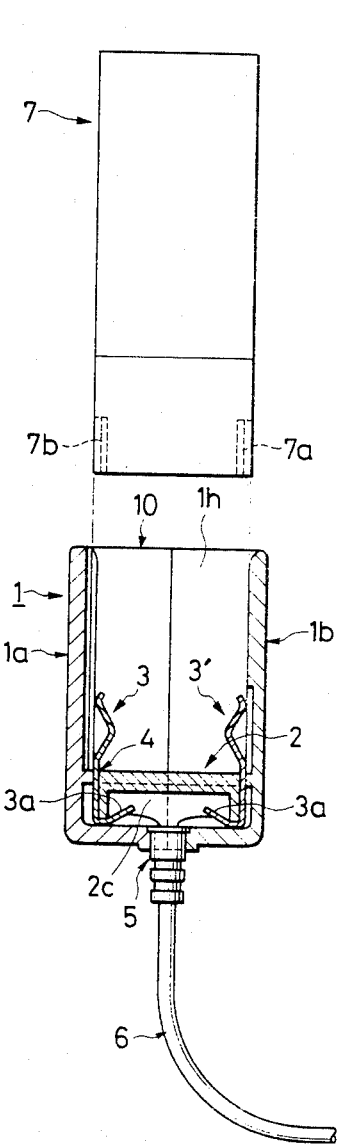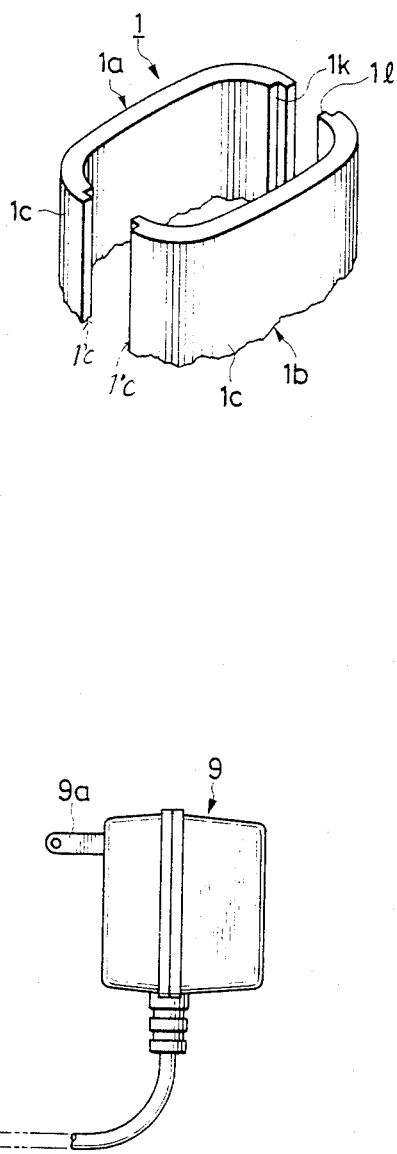

SOCKET FOR AN ELECTRIC CHARGER OF A BATTERY

BACKGROUND OF THE INVENTION

1. Field of the Invention

The present invention relates to a socket for an electric charger whichi has a body containing a charging circuit and has the socket electrically connected to the body through a cord and in which the case of a storage battery is removably fitted in the socket so that the storage battery is electrically charged.

2. Background of the Invention

The socket of a conventional electric charger has a large number of parts and is not efficiently manufactured. For that reason, the size and weight of the socket are large, the socket is hard to use, and the cost of the socket is high. The socket has such disadvantages. Examples of electrical charging devices are disclosed in Japanese Patent Application-Early Publication No. 58-99228, and Japanese Utility Model Publication Nos. 58-47805 and 58-54848.

SUMMARY OF THE INVENTION

The present invention was made in order to eliminate the above-mentioned disadvantages. Accordingly, it is an object of the present invention to provide a socket for an electric charger whose body contains a charging circuit and is electrically connected to the socket to electrically charge a storage battery while the case of the storage battery is removably fitted in the socket. The socket has a very small number of parts and is easy to assemble, so that the socket can be cheaply manufactured to be compact and light.

The socket includes a terminal plate pusher having terminal plate fitting recesses on the right and left sides and bottom of the pusher. A plurality of socket body members are joined to each other to constitute the body of the socket to pinch the terminal plate pusher between the socket body members and they have fitting notches near the bottoms of the socket body members, the terminal plate pusher is fit. When terminal plates are fitted in the terminal plate fitting recesses of the terminal plate pusher, the pusher is pinched in the body of the socket so that the terminal plates, the terminal plate pusher and the socket body members are integrally assembled as the socket. The above-mentioned disadvantages are thus eliminated.

It is very easy to join the socket body members to each other to pinch the terminal plate pusher between the socket body members and pinch the terminal plates between the terminal plate pusher and the socket body members to thereby assemble the socket.

Since the socket body members can be provided with the same form, they can be molded by the same pair of dies. For that reason, the socket can be cheaply manufactured.

Since the terminal plates are pinched between the socket body members and fitted in the terminal plate fitting recesses of the terminal plate pusher, the parts of the socket are firmly fixed although the parts are simply assembled, so that they neither vibrate nor come off. Therefore, the durability of the socket is high.

BRIEF DESCRIPTION OF THE DRAWINGS

FIG. 4 shows a longitudinally sectional view of the socket shown in FIG. 3.

FIG. 5 shows a perspective view of portions of the assembled body members of the socket shown in FIG. 3.

DETAILED DESCRIPTION OF THE PREFERRED EMBODIMENTS

Embodiments of the present invention are hereafter described in detail with reference to the drawings.

Figure 1:
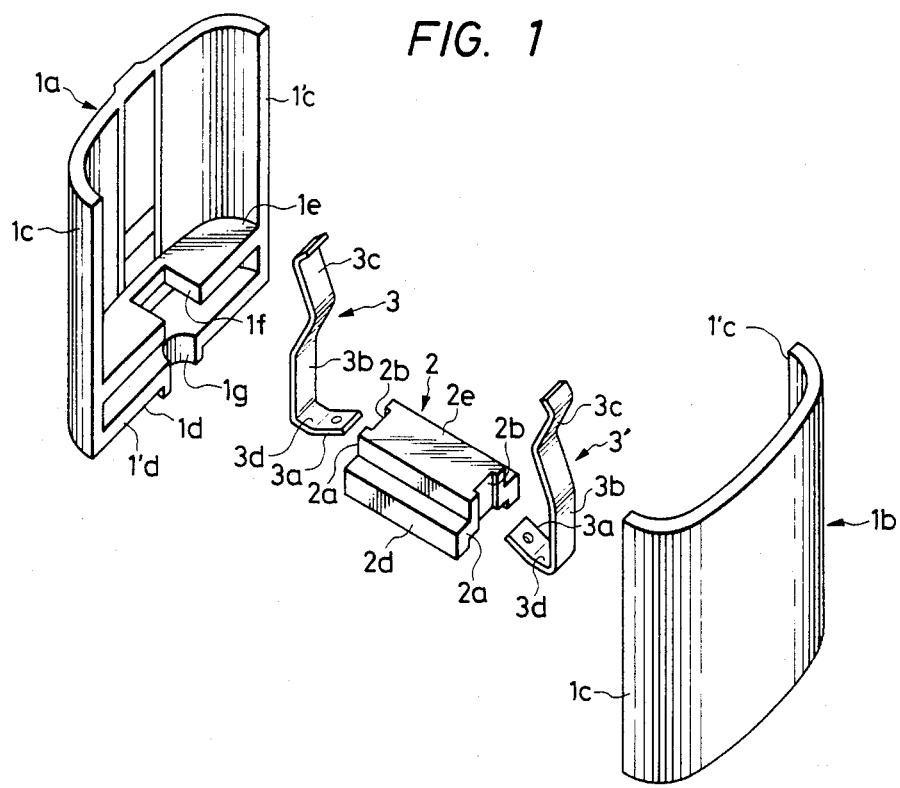
FIG. 1 shows an exploded perspective view of a socket for an electric charger, which is an embodiment of the present invention.
Figure 2:
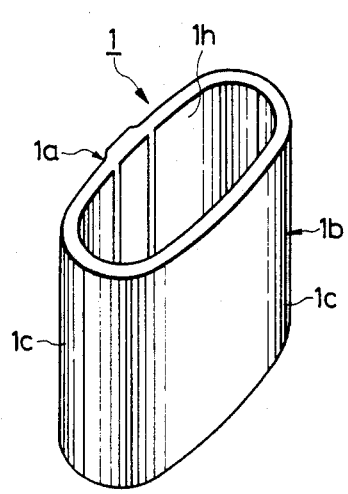
FIG. 2 shows a perspective view of the socket.

FIGS. 1 and 2 show one embodiment of a socket. The socket comprises a small number of parts which are a body 1, a terminal plate pusher 2 and two terminal plates 3 and 3'.

The socket body 1 consistsof two socket body members 1a and 1b which are halves of the body 1 and whose side edges are butted to each other so that the members 1a and 1b are conjoined to each other in the form of a tube open at its top. Each of the socket body members 1a and 1b has a wall 1c, a bottom 1d and a pinching plate 1e located inside the wall 1c and extending over the bottom 1d in parallel with it at an appropriate distance from the bottom 1d. The central portion of the pinching plate 1e has a horizontal oblong notch 1f, in which the terminal plate pusher 2 is fitted. The central portion of the bottom 1d has a semi-circular notch 1g through which a cord 6 (FIG. 4) is laid.

Both the socket body members 1a and 1b are fuse-bonded to each other while the side edges 1'c, 1'd and 1'e of the walls 1c and the bottom 1d and pinching plates 1e of the socket body members butt against each other. As a result, the socket body members 1a and 1b constitute the socket body 1 with a bottom and having an opening 1h at its top. At that time, the fitting notches 1f of the pinching plates 1e of the socket body members 1a and 1b constitute a slender horizontal oblong opening 4 (FIG. 4), in which the terminal plate pusher 2 is fitted. The cord insertion notches 1g of the bottoms 1d of the socket body members 1a and 1b constitute a circular hole 5, through which the cord 6 is laid.

The terminal plate pusher 2 is a horizontal block, best illustrated in FIG. 1. Terminal plate fitting recesses 2b are provided on the right and left sides and at the bottom of the pusher 2. The depth of each of the recesses 2b is nearly equal to the thickness of each of the terminal plates 3 and 3' so that the terminal plates 3 and 3' can be appropriately fitted in the recesses 2b. The central portion of the bottom of the terminal plate pusher 2, as shown in FIG. 4, has a central recess 2c, which communicates at its right and left ends with the side terminal plate fitting recesses 2b and has sufficient depth that obliquely-rising bent feet 3a of the terminal plates 3 and 3', which are electrically connected with the cord 6, can be placed in the central recess 2c.

The terminal plate pusher 2 is tightly fitted in the vertical direction between the bottom 1d and pinching plates 1e of the members 1a and 1b of the socket body 1. The pusher 2 comprises lateral portions 2d and a central portion 2e. The distance between the major side surfaces of the lateral portions 2d is larger than the width of the fitting opening 4. The central portion 2e is tightly fitted in the horizontal direction into the opening 4.

Each of the terminal plates 3 and 3' is made of a bent elastic metal plate and comprises a rising portion 3b, a bent portion 3b bent nearly squarely inwards from the lower end of the rising portion 3b, a bent foot 3a inwardly and obliquely rising from the lower end of the bent portion 3d, and a top portion 3c extending from the upper end of the rising portion 3b and bent inwards at the tip of the top portion 3c so that the top portion 3c can be put in contact with either a positive terminal 7a or a negative terminal 7b on a casing 7 of a storage battery.

Figure 3:
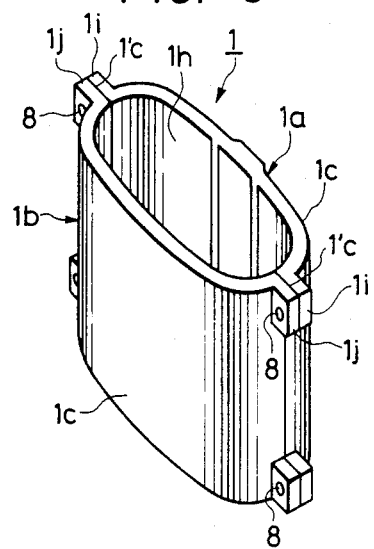
FIG. 3 shows a perspective view of a socket for an electric charger, which is another embodiment of the present invention.

Alternatively, as shown in FIG. 3, mutually corresponding flanges 1i may be provided at the butted side edges 1'c of the walls 1c of the socket body members 1a and 1b. The flanges 1i are secured to each other by screws 8 to join the socket body members 1a and 1b to each other without fuse-bonding them to each other as described above.

As shown in FIG. 5, notches 1k and projections 11 may be provided at the side edges 1'c of the walls 1c of the socket body members 1a and 1b. The notches 1k and projections 11 fit with each other to join together the socket body members by fuse-bonding the walls 1c to each other or securing their flanges to each other by screws 8 as described above.

When the socket 1 is being assembled, the terminal plates 3 and 3' are first fitted in the terminal plate fitting recesses 2b of the terminal plate pusher 2. At that time, the rising portions 3b of the terminal plates 3 and 3' and their bent portions 3d under the rising portions 3b are fitted into the recesses 2b of the pusher 2. Also, the bent feet 3a already electrically connected with the positive and negative wires of the cord 6 extending from an electric charger body 9 containing a charging circuit are fitted in the recess 2c of the pusher 2. The socket body members 1a and 1b are then butted to each other while both ends of the central portion 2e of the terminal plate pusher 2 and the terminal plates 3 and 3' are fitted in the fitting notches 1f of the socket body members 1a and 1b. The socket body members 1a and 1b are thereafter secured to each other by fuse-bonding, screw-tightening or the like. The cord 6 is laid through the cord insertion hole 5 constituted by the cord insertion notches 1g of the socket body members 1a and 1b. The assembly of socket 1 is thus completed.

As shown in FIG. 4, the socket 1, which is assembled as described above, has a central vertical hole 10, in which the casing 7 of the storage battery or equivalent electric storage medium is fitted. Since the terminal plates 3 and 3' are vertically secured at the right and left of the inside surface of the socket 1 and located in the hole 10, the positive terminal 7a and the negative terminal 7b on the sides of the storage battery casing 7 are put in contact with the bent portions 3c of the terminal plates 3 and 3' when the storage battery casing 7 is fitted in the hole 10, so that the terminal plates are electrically connected with the terminals 7a and 7b.

When a plug 9a on the electric charger body 9, which contains a well known AC-DC charging circuit, is inserted into an electrical outlet, the storage battery is electrically charged.

What is claimed is:

1. A socket for an electric charger including a charging circuit for charging an electric storage battery inserted into a top of said socket, comprising:
    a pusher member having recesses on its two lateral sides and its bottom side;
    two terminal plates fitted into respective ones of said lateral recesses; and
    a plurality of socket body members joinable to each other in a lateral direction and having laterally extending notches at a middle portion fittable with said pusher member and with said two terminal plates, whereby said joined socket body members laterally pinch together said pusher members and terminal plates, said storage battery being receivable into a top of said joined socket body members and having electric contacts contactable with said terminal plates.

2. A socket as recited in claim 1, further comprising two wires powered by said charging circuit and connected to respective ones of said terminal plates.

3. A socket as recited in claim 1:
    wherein said two terminal plates fit into said bottom recess.

4. A socket as recited in claim 2:
    wherein at least two of said socket body members each comprises a bottom plate with an opening for said two wires and a laterally extending middle plate including one of said notches; and
    wherein said pusher member comprises an upwardly and laterally extending upper portion and two transversely and laterally extending side portions, said upper portion tightly fitting in said notches and said side portions tightly fitting between said bottom plates and said middle plates.

5. A socket as recited in claim 3, wherein said socket body members have grooves and notches mating said socket body members together.

6. A socket as recited in claim 3, wherein said socket body members are fused to each other.

7. A socket as recited in claim 3, wherein said socket body members are screwed together.

* * * * *